United States Patent [19]
Fox et al.

[11] Patent Number: 5,606,919
[45] Date of Patent: Mar. 4, 1997

[54] SPACE-DIVIDING FENCE FOR POWER AND/OR COMMUNICATION DISTRIBUTION

[75] Inventors: Robert A. Fox, Allendale; Wayne B. Miedema, Holland; Robert C. Weener, Holland; Stephen B. Greenman, Holland; Timothy J. Syfert, Holland, all of Mich.

[73] Assignee: Haworth, Inc., Holland, Mich.

[21] Appl. No.: 486,614

[22] Filed: Jun. 7, 1995

[51] Int. Cl.$^6$ .................................................. A47B 35/00
[52] U.S. Cl. ........................................ 108/50; 312/223.6
[58] Field of Search ................................. 108/50, 64, 23, 108/153; 312/223.6, 223.1, 194, 195

[56] References Cited

U.S. PATENT DOCUMENTS

| | | |
|---|---|---|
| 3,552,042 | 1/1971 | Rabineau . |
| 4,094,256 | 6/1978 | Holper et al. .............................. 108/50 |
| 4,224,769 | 9/1980 | Ball et al. . |
| B 4,224,769 | 5/1980 | Ball et al. . |
| 4,748,913 | 6/1988 | Favaretto et al. ........................ 108/50 |
| 4,762,072 | 8/1988 | Boundy et al. ........................... 108/50 |
| 4,781,609 | 11/1988 | Wilson et al. . |
| 4,838,177 | 6/1989 | Vander Park .......................... 108/50 X |
| 4,852,500 | 8/1989 | Ryburg et al. ........................ 108/50 X |
| 4,879,955 | 11/1989 | Moll et al. ................................. 108/50 |
| 5,024,167 | 6/1991 | Hayward ................................. 108/50 |
| 5,037,164 | 8/1991 | Weissenbach et al. ................... 108/50 |
| 5,152,698 | 10/1992 | Juhlin et al. . |
| 5,154,126 | 10/1992 | Newhouse et al. ....................... 108/50 |
| 5,318,259 | 6/1994 | Fussler ............................. 312/223.6 X |
| 5,394,658 | 3/1995 | Schreiner et al. ............... 312/223.6 X |

*Primary Examiner*—Jose V. Chen
*Attorney, Agent, or Firm*—Flynn, Thiel, Boutell & Tanis, P.C.

[57] ABSTRACT

An upright electrical power and telecommunication distribution having a plurality of upright posts disposed in horizontally spaced relationship, and horizontally-elongate rails extending between and rigidly joined to each adjacent pair of posts. The lower rail defines a channel for accommodating electrical power cabling, and the upper rail also has a channel for accommodating communication cabling. The posts define openings therein to enable the power and communication cables to pass through the post for communication with the rails which are joined thereto. The upper rail is open on the top and accommodates a removable cap to facilitate laying in of telecommunication cables, and one of the side walls of the upper rail has openings for accommodating boxes or plates mounting telecommunication connectors. The lower rail is open on the bottom to facilitate insertion of electrical power cabling, the bottom being closed by a removable cover. In the preferred embodiment electrical power is provided by a power module including a power block which attaches to and is suspended from the underside of the lower rail, which power block accommodates a removable receptacle unit on either or both sides thereof. The power module has an elongate cable projecting the power block and which extends longitudinally along the lower rail for projection into an adjacent rail, with the cable having a pluglike connector which can be engaged with a power block mounted on the adjacent rail.

25 Claims, 14 Drawing Sheets

SPACE-DIVIDING FENCE FOR POWER AND/OR COMMUNICATION DISTRIBUTION

FIELD OF THE INVENTION

This invention relates to an upright and horizontally-elongated space-dividing arrangement which includes vertically isolated channels for respectively containing electrical and telecommunication cables to facilitate access thereto from adjacent workstations.

BACKGROUND OF THE INVENTION

In office-type working environments large floor areas are conventionally divided into smaller areas including individual workspace areas by use of various types of office furniture, with one of the more commonly utilized furniture components being upright space-dividing panels which horizontally serially connect for dividing the large areas into smaller work areas, commonly referred to as workstations. To facilitate the supplying of electrical power and telecommunication cabling to and accessing of same at the workstations, it is now conventional practice to provide the upright space-dividing panels with channels or raceways extending horizontally therealong for accommodating therein the electrical power and telecommunication cables. These cables are typically provided in channels or raceways which extend along the bottom of the panels, although sometimes they also extend along channels or raceways formed either adjacent the top of the panel or at worksurface height. Because of the increased need to effect isolation of the electrical power and telecommunication cables from one another, often times the power cables extend along a bottom channel, and the telecommunication cables extend along a top channel.

While panels of the general type described above are extensively utilized in office environments, nevertheless there is an need in some instances to provide for a plurality of workstations within a large open area, with the individual workstations being at least partially divided or isolated from one another, but without possessing or requiring the degree of privacy provided by panels. Such workstations, however, still require that electrical power and telecommunication cables be provided thereto. In an effort to address such need, furniture components and systems have been developed which enable the supplying and accessing of power and telecommunication cabling from workstations without relying on panels for defining the conduits or raceways therefor. For example, attempts have been made to provide horizontally elongate trough members which are independent of other accessories and which set generally directly on the floor and which can be utilized in conjunction with other furniture accessories to define workstations. Such troughs do permit power and telecommunication cables to be disposed therein in separate channels if desired, although such troughs result in all cabling being disposed substantially closely adjacent the floor, and also result in minimum separation between the power and telecommunication cabling.

Another example of a non-panel type system involves use of upright open frames which permit plural channel-like troughs to be mounted horizontally between the frame uprights, with these troughs accommodating therein the desired cables. This type arrangement, however, is normally intended to accommodate removable covers so as to effectively resemble a frame or panel arrangement when completed, and if used without the covers is not believed to provide an overall aesthetically pleasing appearance for office use.

Accordingly, it is an object of this invention to provide an improved upright arrangement which is a non-panel type arrangement for use in dividing large open office areas into smaller work areas, which arrangement facilitates the supplying of both electrical power and telecommunication cabling to work areas defined adjacent the upright arrangement so as to provide access thereto, and which retains an open but aesthetically pleasing appearance so as to permit its use in an office environment. This arrangement, however, permits and facilitates selected partial enclosure by means of removable skins, such as fabrics or rigid covers, so as to provide greater and selectable degrees of privacy, and at the same time increase the flexibility of appearance and decorativeness thereof.

Briefly summarizing the upright electrical power and telecommunication distribution arrangement of this invention, there is provided a plurality of upright posts disposed in horizontally predetermined spaced relationship from one another, and at least two horizontally-elongate rails, namely upper and lower vertically spaced rails, extending between and rigidly joined to each adjacent pair of posts. The lowermost rail is spaced upwardly a desired distance from the floor and defines a channel therethrough for accommodating electrical power cabling, and the upper rail also has a channel therethrough for accommodating communication cabling. The posts are preferably hollow and define openings through the side walls thereof which enable the power and communication cables to pass through the post for communication with the rails which join to the posts. The upper rail is open on the top and accommodates a removable cap to facilitate the laying in of telecommunication cables, and one of the side walls (for example the bottom wall) of the upper rail has openings for accommodating boxes or plates bearing the desired telecommunication connectors. The lower rail is open on the bottom to facilitate the insertion of electrical power cabling, the bottom being closed by a removable cover. In the preferred embodiment electrical power is provided by a power module including a power block which attaches to and is suspended from the underside of the lower rail, which power block accommodates a removable receptacle unit on either or both sides thereof. The power module has an elongate cable projecting the power block and which extends up and longitudinally along the lower rail for projection into an adjacent rail which connects to a common post, with the cable having a pluglike connector which can be engaged with the power block mounted on the adjacent rail. The power modules are preferably of a length which approximately corresponds with the rail length, or multiples thereof, to facilitate the insertion and serial connection together of several such power modules longitudinally along a plurality of rails which are interconnected through intermediate posts.

In the arrangement of this invention, the rails may be provided with removable skins on one or both sides thereof, such as rigid panel-like members or flexible sheetlike fabrics. For such purpose the upper rail and top cap cooperate to define an elongate slit extending along each side of the upper rail adjacent the top thereof. This slit accommodates removable hooks which project sidewardly of the rail for mounting a skin thereon, which skin is suspended downwardly along one side of the rails for effectively covering the open region between the vertically spaced rails.

Other objects and purposes of the invention will be apparent to persons familiar with structures of this general type upon reading the following specification and inspecting the accompanying drawings.

Figure 1:
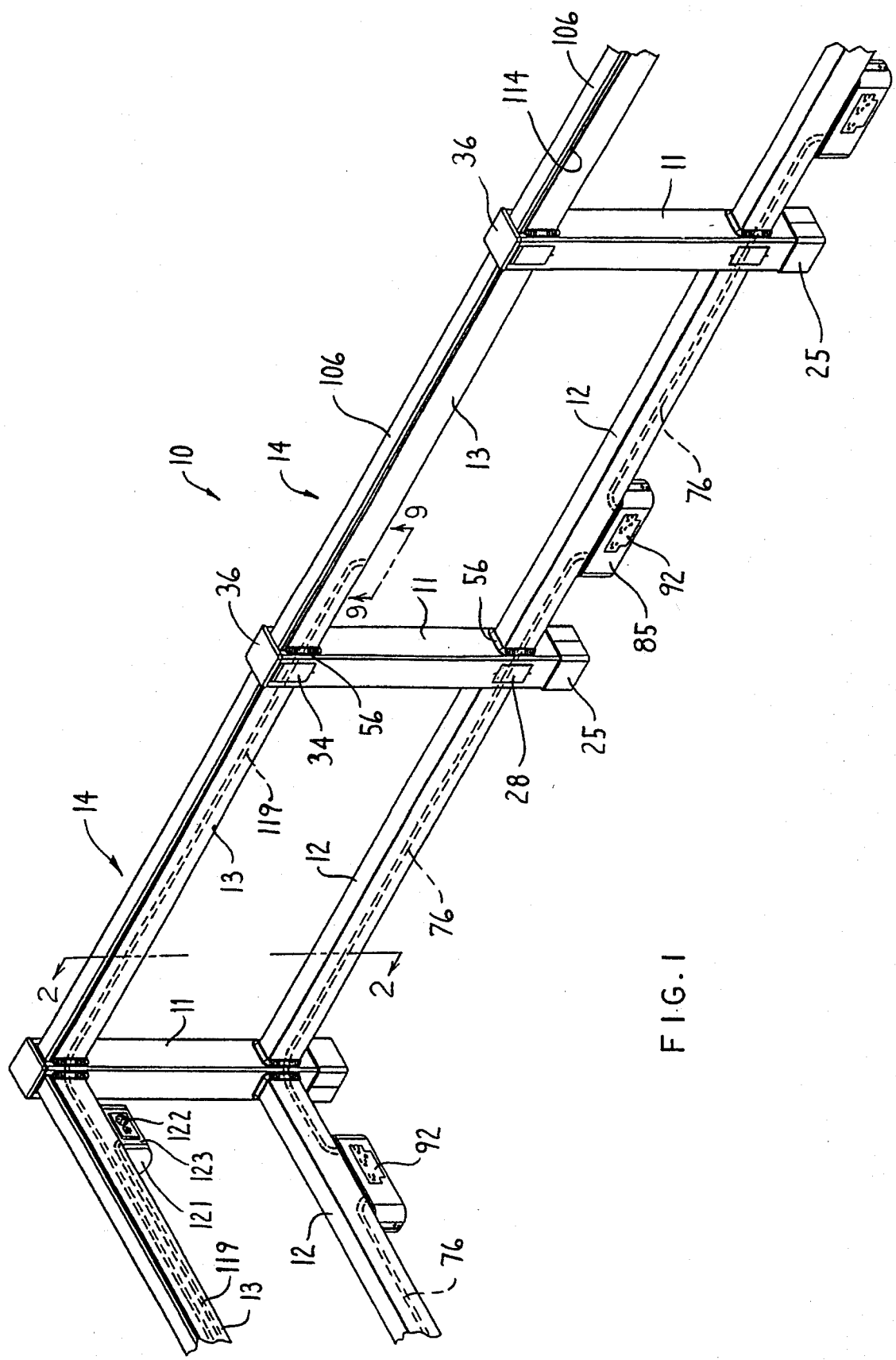
FIG. 1 is a perspective view of a space-dividing power-communication distribution system according to the present invention.

Certain terminology will be used in the following description for convenience in reference only, and will not be limiting. For example, the words "upwardly" "downwardly", "rightwardly" and "leftwardly" will refer to directions in the drawings to which reference is made. The words "upwardly" and "downwardly" will also refer to the normal geometric orientation of the system when in a position of use. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, there is illustrated a space-dividing power/communication distribution system or fence 10 according to the present invention. This system 10 is adapted to be supported in a generally upright free-standing vertical orientation on a support floor, typically within a large work area, for at least partially dividing the large area into smaller work areas such as workstations. This space-dividing system or arrangement 10 also permits electrical power and telecommunication cabling to extend longitudinally therealong for access from the individual work areas or workstations disposed adjacent either side of the arrangement.

The arrangement 10 of the invention includes a plurality of upright post assemblies 11 which are supported in a generally freestanding manner on a support floor, with the individual post assemblies being horizontally spaced predetermined distances apart. Each adjacent pair of post assemblies 11 are rigidly joined together by first and second horizontally elongate rails 12 and 13 extending therebetween, which rails are parallel and are vertically spaced one substantially vertically aligned above the other. The first or lower rail 12 is provided for permitting electrical power cabling to extend therethrough, and may hereinafter be referred to as the power rail. The other or upper rail 13 is provided for permitting telecommunication cabling to extend longitudinally thereof, and may hereinafter be referred to as the communication rail. The lower or power rail 12 is normally spaced vertically upwardly a predetermined distance from the support floor, which upward vertical spacing will typically be a minimum of about five inches. Similarly, the upper or communication rail 13 in turn is spaced vertically upwardly a predetermined vertical spacing above the lower rail 12, with the vertical clearance between the rails 12 and 13 typically being a minimum of about twenty inches. The upper or communication rail 13, in the two-rail embodiment illustrated by FIG. 1, is also typically disposed at an elevation such that is connects to the posts closely adjacent the upper ends thereof, whereby the upper free ends of the posts project upwardly above the upper rails 13 by only a small vertical extent.

It will be appreciated, as illustrated by FIG. 1, that the power/communication distribution arrangement 10 of this invention is defined by a plurality of generally interconnected sections 14, each horizontally elongated section 14 being defined by two adjacent post assemblies 11 rigidly joined by the rails 12 and 13 extending therebetween, with several such sections being joined in either aligned or perpendicular relationship to one another, with the adjacent sections sharing a common post assembly.

Figure 2:
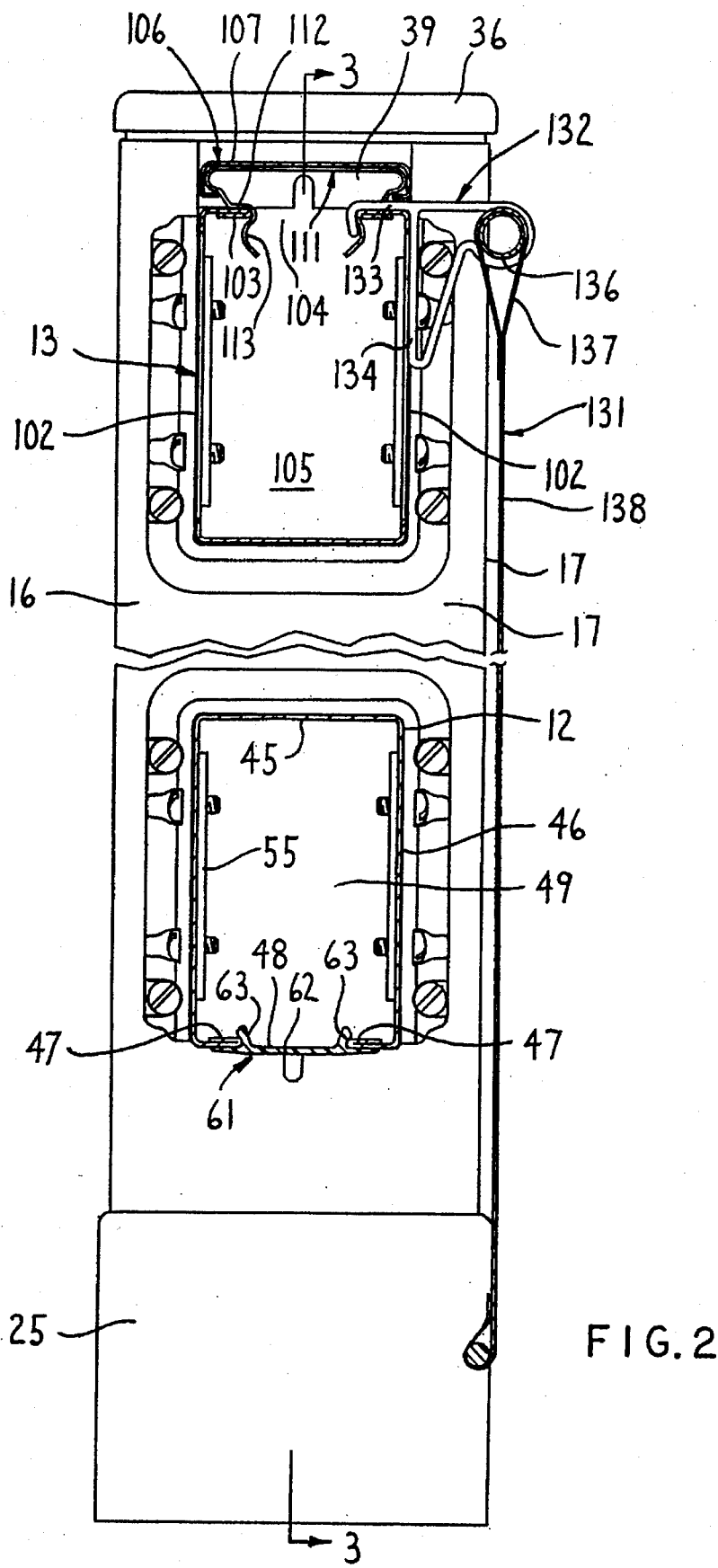
FIG. 2 is an enlarged, fragmentary sectional view taken generally along line 2—2 in FIG. 1.
Figure 3:
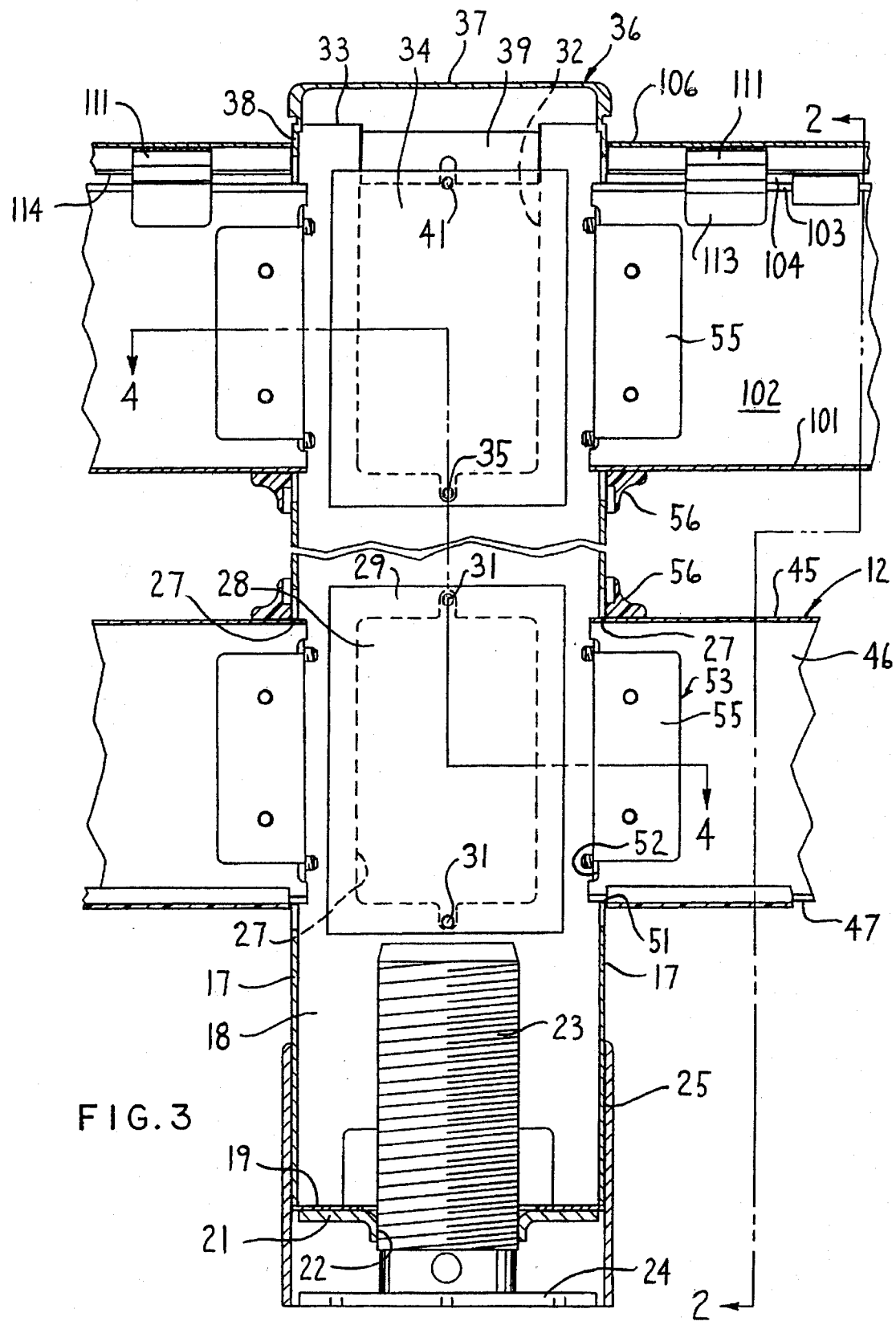
FIG. 3 is a fragmentary sectional view taken generally along line 3—3 in FIG. 2.
Figure 4:
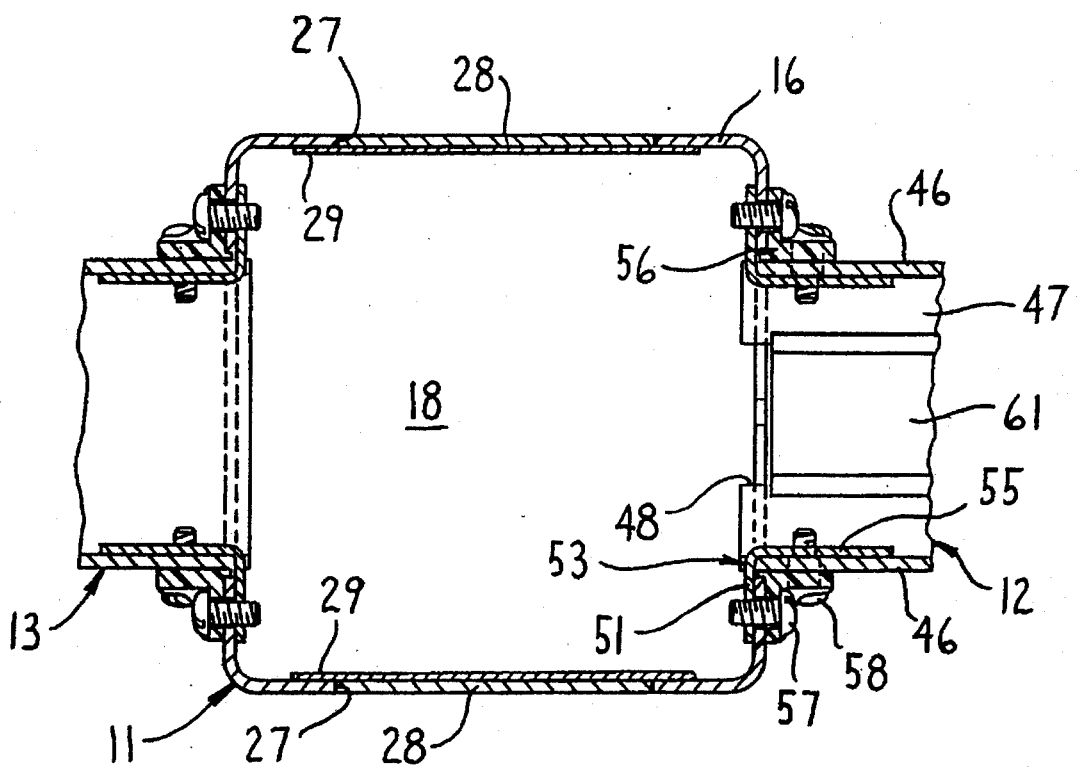
FIG. 4 is a sectional view taken generally along line 4—4 in FIG. 3.
Figure 5:
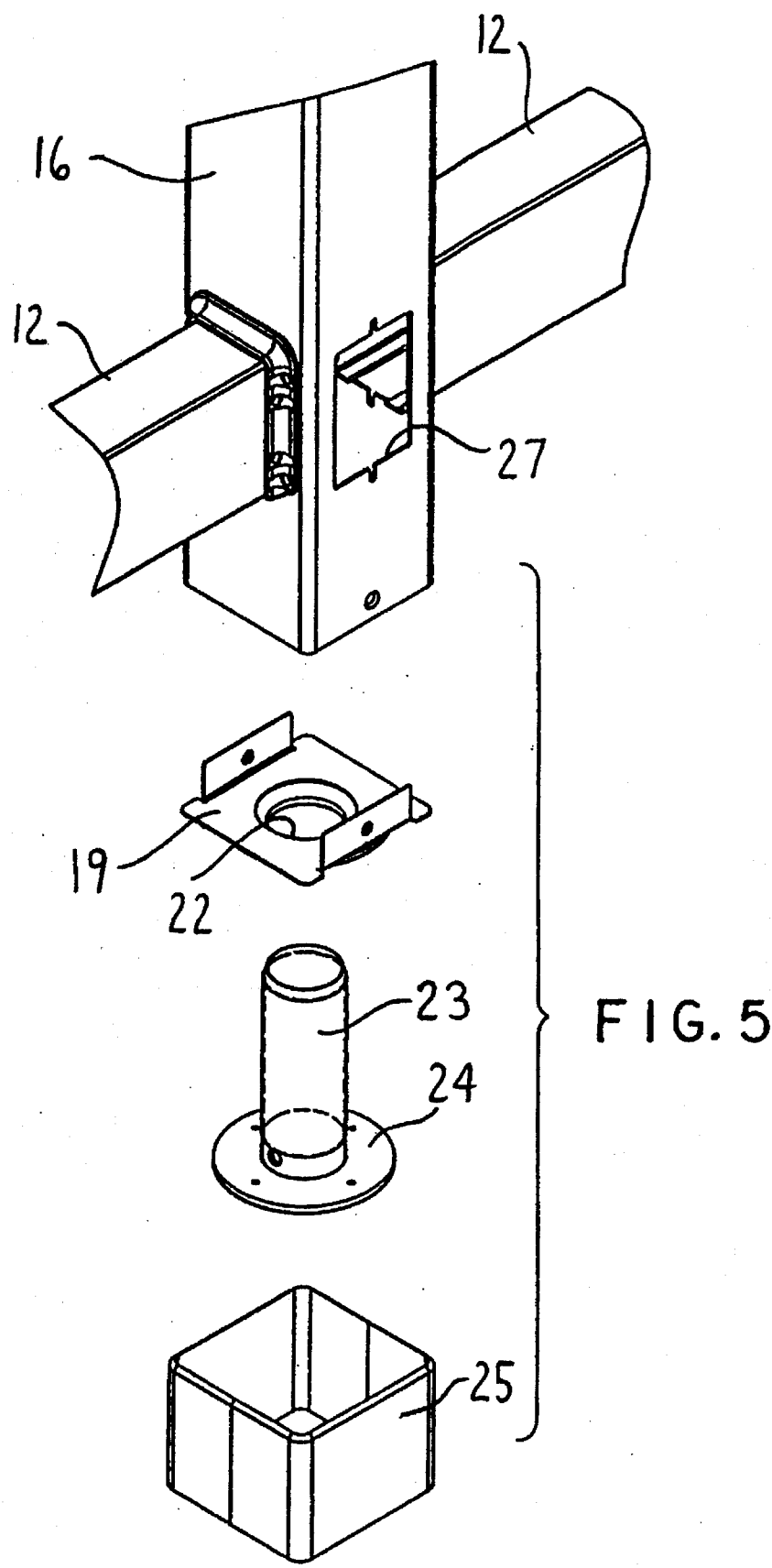
FIG. 5 is an exploded, fragmentary, perspective view illustrating the bottom of a post and of the glide structure associated therewith.

Each post assembly 11, as shown by FIGS. 2–4, is defined by an elongate upright tubular post member 16 having a plurality of generally flat or planar side walls 17, the tubular post member 16 in the preferred embodiment being of a square cross section. This post member 16, which has a hollow interior 18 extending throughout the length thereof, has a bottom plate 19 extending transversely across and fixed to the lower end thereof. This bottom plate 19 mounts thereon a nut member 21 which defines a threaded opening 22 extending vertically therethrough generally along the post centerline, and this accommodates therein a threaded portion of a vertically elongated support glide 23. This glide 23 has an enlarged platelike foot 24 on the lower end thereof disposed for supportive engagement with the floor. A tubular collar 25, also of square cross section in the illustrated embodiment, closely slidably and exteriorly surrounds the post member 16 and is adapted to be slid downwardly past the free end of the post in surrounding relationship to the foot 24 so as to engage the floor and provide a substantially continuous upright closed configuration when the post assembly is fully assembled. The post assembly 11 has an overall height which is significantly less than floor-to-ceiling height.

The post member 16 has a first plurality of openings 27 formed transversely through the side walls thereof. In the illustrated and preferred embodiment, one such opening 27 is formed in each of the four side walls 17, with all of these openings 27 being at the same elevation so as to be disposed for cooperation with a lower rail 12. Each opening 27, if not used for accommodating a support rail 12, has a generally rectangular platelike cover 28 removably but fixedly disposed therein so that the outer surface of the cover is preferably substantially flush and continuous with the outer surface of the respective side wall 17. The cover 28 has a rear flange or rim 29 which extends outwardly and abuttingly overlaps the inner surface of the respective side wall 17 in surrounding relationship to the opening 27 so as to hold the cover 28 in position. Suitable openings 31 are provided adjacent the upper and lower edges of the opening and project through the cover flange for accommodating small fasteners such as sheet metal screws for stationarily holding the cover in position.

In a similar fashion, the post member has a second plurality of openings 32 formed so as to extend through the side walls 17 thereof, and in the illustrated embodiment one such opening 32 extends through each of the flat side walls 17 so that a total of four such openings 32 are provided all at the same elevation. Each opening 32 is disposed vertically upwardly from and substantially vertically aligned with the opening 27 associated with the respective side wall 17.

The openings 32 in the illustrated and preferred embodiment are formed such that they open downwardly from the upper free edge 33 of the post member 16, these openings 32 having a vertical height which is slightly greater than the vertical height of the openings 27. Each opening 32, if not used for accommodating an upper rail 13, also has fixedly but removably positioned therein a cover 34. This cover 34 is identical to the cover 28 described above and snugly fits within the respective opening 32 so as to be flush with the surface of the side wall, and a suitable threaded fastener extends through aligned openings 35 adjacent the lower edge of the respective opening.

The upper open end of the post member 16 is closed by a cap 36, the latter having a generally flat top wall 37 which has a generally annular skirt 38 of square cross section projecting downwardly from the peripheral edge thereof. This skirt 38 is snugly slidably engaged interiorly within the upper end of the post member 16. The cap 36, on each side wall of the skirt 38, is provided with a platelike rectangular tongue 39 projecting downwardly from the center thereof, which tongue 39 is slidably accommodated within the upper free end part of the respective opening 32 so as to close off the upper end of this opening and effectively abut against the upper edge of the respective cover 34 as illustrated by FIG. 3 so as to define a flush exterior side surface therewith. The tongue and cover have suitable aligned openings 41 therethrough for accommodating a threaded fastener which assists in fixedly interrelating the cover 34, the cap 36 and the post member 16.

Considering now the lower or power rail 12, it is formed primarily by a vertically inverted channel-shaped member having a top wall 45 joined by generally parallel side walls 46 which project vertically downwardly from the top wall. Bottom flanges 47 project inwardly toward one another from lower edges of the side walls 46, thereby defining a bottom wall for the rail member. These bottom flanges 47, however, are sidewardly spaced apart and define a slotlike opening 48 therebetween, the latter being elongated longitudinally throughout the length of the rail for providing access with the interior channel 49 defined inside of the rail.

The end of the rail 12 is adapted to cooperate with one of the lower post openings 27 and, as shown in FIG. 3, the rail end projects slightly inwardly through the opening 27 so that the bottom flanges 27 of the rail rests on the bottom edge 51 of the opening. Each of the side walls 46, at the free end thereof, have a shallow cutout or recess 52 opening inwardly from the free edge. This recess 52 accommodates therein an L-shaped bracket 53, one leg 54 of which is disposed inside the post member and overlaps the inner surface of the side wall 17 directly adjacent one side of the opening 27, and the other leg 55 of which projects into and directly abuttingly overlaps the inside surface of the rail side wall 46. A U-shaped collar 56 is also provided, which collar opens downwardly and snugly surrounds the top and side walls 45 and 46 of the lower rail and directly abuts the adjacent exterior surface of the respective post member side wall 17. The side legs of the collar 56, and the legs 54 of the brackets 53, have aligned openings therethrough which, in conjunction with openings formed through the side wall of the post member, accommodate suitable threaded fasteners 57 for creating a fixed connection therebetween. In similar fashion, other threaded fasteners 58 extend through aligned openings which extend in the transverse direction, namely through the side legs of the collar and thence through the side wall of the rail and the other bracket leg 55 for permitting fixed securement therebetween. In this fashion the end of the rail 12 is rigidly, but releasably, secured to the post member so that the interior channel 49 of the rail 12 is thus in open communication with the interior of the post.

The lower rail 12 also removably mounts thereon an elongate bottom cover 61 for closing off the slotlike opening 48 which extends longitudinally along the bottom wall. This cover 61 includes a generally flat plate part 62 which has a pair of upwardly projecting flanges or tangs 63 which resiliently deflect upwardly between and create a gripping engagement with the bottom flanges 47 so as to permit releasable but resilient gripping of the cover 61 to the bottom of the rail. This cover 61 is preferably constructed of a plastic material, such as by being extruded in the elongate direction thereof, to provide the cover with the desired stiffness but limited resiliency.

Figure 6:
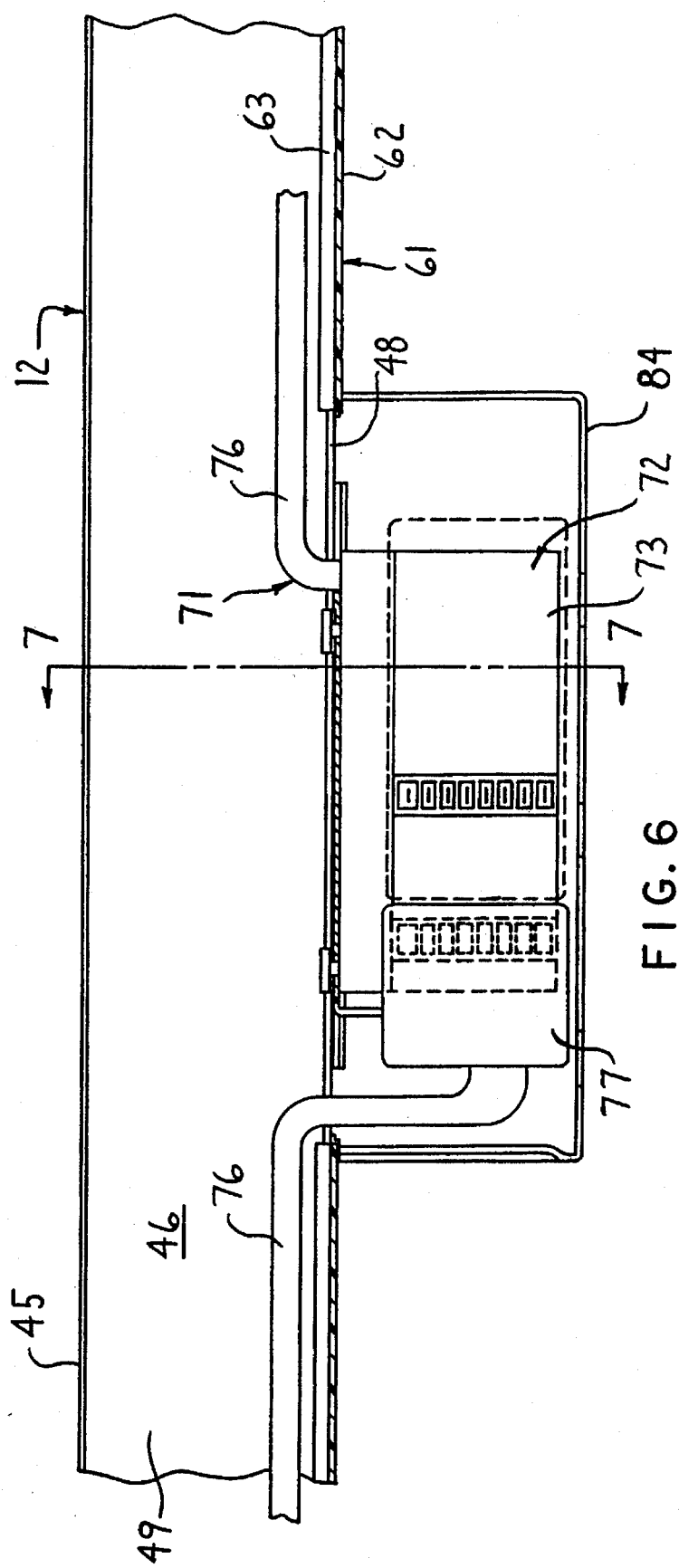
FIG. 6 is an enlarged, fragmentary view, partially in cross section, showing a power module suspended from the bottom rail.
Figure 7:
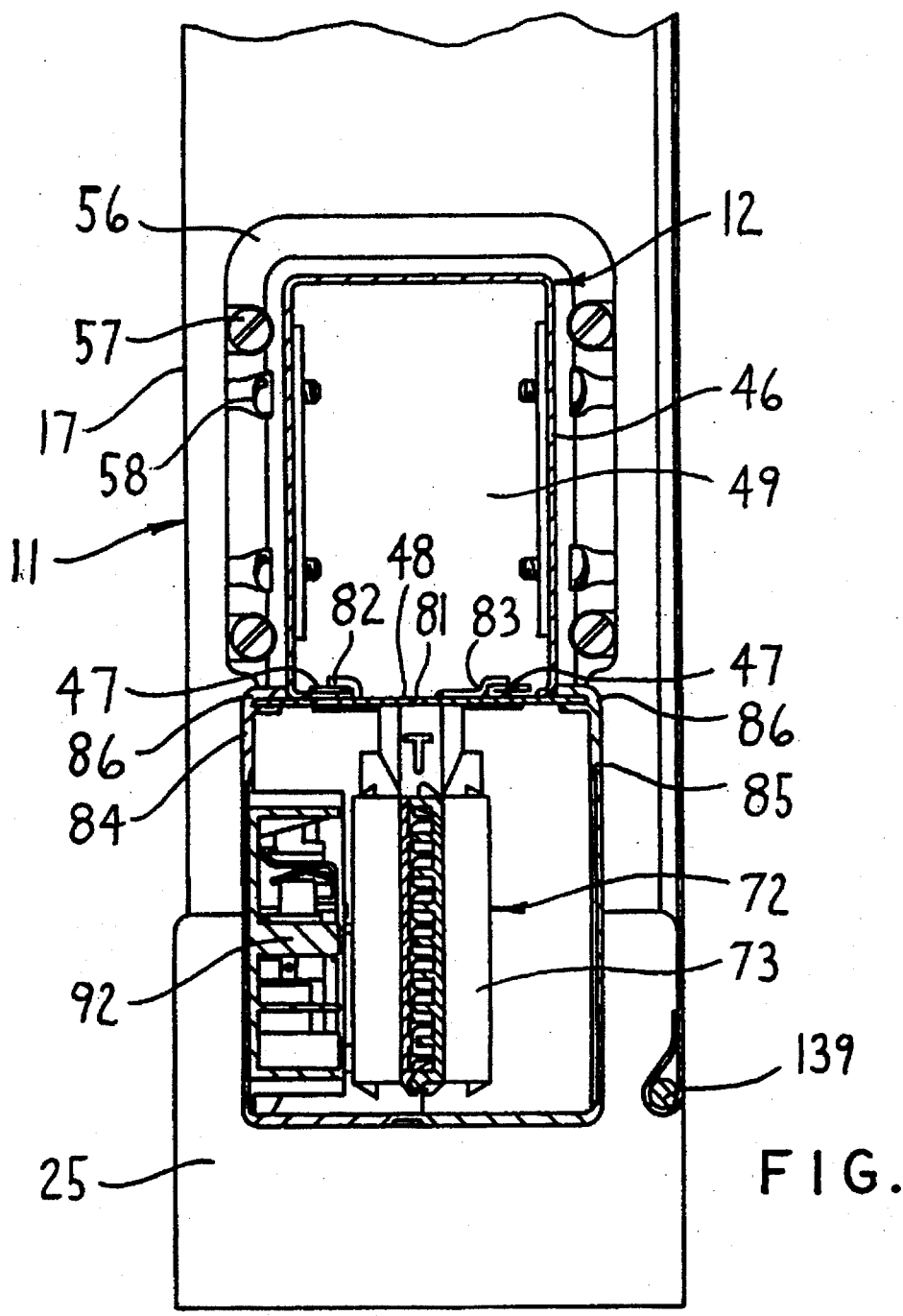
FIG. 7 is a fragmentary sectional view taken along line 7—7 in FIG. 6.
Figure 8:
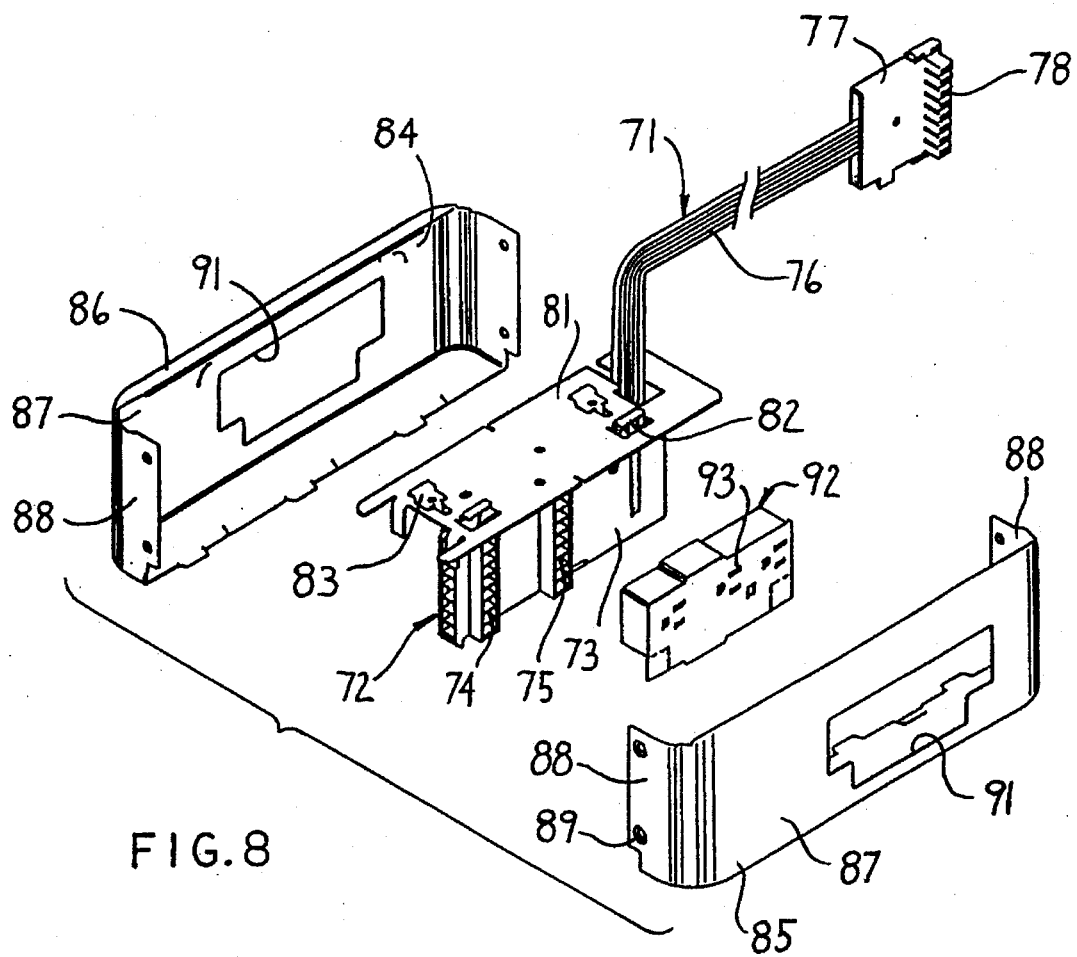
FIG. 8 is an exploded perspective view of the power module.

The lower rail 12 is adapted to mount thereon a power module 71 which, as illustrated by FIGS. 6 and 7, includes a power block 72 defined by an insulative housing 73 mounting a plurality of electrically conductive elements therein, which housing and conductive elements cooperate to define a pair of multi-contact socketlike electrical connectors 74 disposed adjacent one end of the housing and facing outwardly from opposite sides thereof. This power block also includes a further pair of multi-contact socketlike electrical connectors 75, one such connector 75 being defined on and projecting outwardly from each side of the power block housing.

The power module 71 also includes an elongate and flexible multi-conductor electrical cable 76 joined to the opposite end of the power block and projecting outwardly therefrom, with the individual conductors of the cable 76 being individually joined to the conductive plates associated with the power block 72. This cable 76 is of a selected length, preferably having a length which is similar in magnitude to the length of the rail 12 so as to enable the cable to extend interiorly through one rail 12 and into an adjacent rail for connection to the power module of the adjacent rail. For this purpose, the free end of the cable 76 has a connector block 77 provided thereon, the latter being defined by an insulative housing having a plurality of separate electrically conductive elements thereon, whereby the connector block 77 defines a multi-terminal pluglike connector 78 associated with one side thereof. This connector 78 is configured so as to create a mating mechanical and electrical pluglike engagement with one of the connectors 74 provided on a second power module 71.

While cable 76 has been described above as a multi-conductor arrangement, it will be appreciated that it could be replaced with a plurality of individual covered conductive wires if desired, and reference herein to cable 76 will be understood to include this variation.

The power module in the illustrated embodiment is preferably an eight conductive wire system which includes three neutrals, three hots and two grounds, with the wires cooperating to define three different electrical circuits. The construction of the power block 72 and its connection to the conductive cable 76 substantially corresponds to the arrangement disclosed in U.S. Pat. No. 4,781,609 (as owned by the Assignee hereof), and the connector block 76 is also substantially identical to the end of the flexible electrical connector as also disclosed in the aforesaid patent. This power block and connector block are also substantially identical to the equivalent components associated with an electrical system sold by Haworth, Inc. under the trademark "The Power Base". Since the structure and function of the power block and connector block are well known, further detailed description thereof is believed unnecessary.

The power block 72 is secured to and projects downwardly from a substantially horizontally extending top mounting plate 81, the latter having a pair of upwardly projecting mounting flanges 82 adjacent one side thereof, and a pair of mounting brackets 83 adjacent the other side thereof. This top mounting flange 81 is adapted to be disposed directly adjacent the bottom flanges 47 of the rail 12 so that flanges 82 project upwardly and wrap around the free end of one of the bottom flanges 47, and the mounting brackets 83 can then be moved outwardly to wrap around the free end of the other bottom flange 47, with these mounting brackets 83 then being suitably secured relative to the top mounting plate 81, as by sheet metal screws or similar threaded fasteners (not shown). This thus enables the power block 72 to be mounted directly on and positioned directly under the rail 12 at any selected location longitudinally therealong, and the cable 76 is then bent upwardly and extended longitudinally along the interior of the rail so that the cable 76 and the connector block 77 thereon can thence be fished through the interior of the post into the next adjacent rail 12 for securement to a power module mounted thereon. The bottom opening 48 of the rail is suitably closed by means of covers 61 being engaged with the bottom flanges of the rail on opposite sides of and extending longitudinally along the rail on both sides of the power block.

With the power block 72 mounted on the rail 12 as briefly described above, the power block is then suitably enclosed by a module cover defined by cover halves or parts 84 and 85 which are adapted to enclose the power block from opposite sides thereof. The cover parts 84 and 85 have generally U-shaped upper edge parts 86 which, as shown in FIG. 7, slidably engage the horizontally outwardly projecting side edge portions of the top mounting plate 81 so as to hold the cover parts in position. These cover parts in turn have main downwardly projecting vertical side walls 87 which are spaced apart in general parallel relationship by a width which substantially equals or slightly exceeds the width of the rail 12, and the side walls 87 in turn have inwardly projecting end flanges 88 which overlap and are joined by suitable fasteners such as screws 89. The cover parts also have bottom walls which project inwardly and engage so that the two cover parts 84 and 85, in cooperation with the top mounting plate 81, substantially wholly enclose the power block 72.

The side wall 87 of each cover part 84 and 85 has an opening 91 extending therethrough, the latter normally being closed by a suitable removable cover (not shown). This opening 91 is provided so that an electrical receptacle unit 92 can be engaged with either of or both sides of the power block 72. The receptacle unit 92 has, on the rear side thereof, a multi-terminal pluglike connector which is adapted to create a mechanical and electrical pluglike engagement with one of the side connectors 75 provided on the power block 72. When mounted on the power block, the exposed side of the receptacle unit projects into the opening 91 so as to be substantially flush with the cover side wall 87, and the exposed front face of the receptacle unit 92 has one or more conventional three-hole electrical sockets 93 associated therewith, the latter accommodating therein a conventional two-prong or three-prong 110-volt electrical plug as associated with conventional electrical appliances.

The construction of the receptacle unit 92 and its cooperation with the power block 72 is also known, being disclosed in aforesaid U.S. Pat. No. 4,781,609, and being commercially available as part of the aforesaid "The Power Base" system as sold by the Assignee hereof.

Considering now the upper or communication rail 13, it comprises a horizontally elongated rail member 99 which is of a generally upright channel-shaped cross section and includes a bottom wall 101 which extends between and joins to lower edges of a pair of upwardly projecting and generally parallel side walls 102. These side walls at their upper edges are joined to inwardly projecting top flanges 103 which effectively define the top wall of the rail member. These top flanges 103, however, are spaced apart by a slotlike opening 104 which is elongated longitudinally throughout the length of the rail. This top opening 104 communicating with the interior channel 105 defined by the rail member. The top rail member is closed by a removable cover 106 which includes a generally horizontal and flat top wall 107 which, at opposite longitudinally extending side edges, is joined to downwardly projecting side flanges 108 which are of short vertical extent and which are then bent inwardly to define inwardly projecting bottom flanges 109. These latter flanges 109 are disposed in upwardly spaced and generally parallel relationship to the top flanges 103, but project inwardly through a lesser extent.

The cover 106 has a plurality of mounting clips 111 secured thereto in longitudinally spaced relation therealong for permitting the top cover 106 to be releasably secured to the rail member 99. Each mounting clip 111 is stationarily held or secured within the downwardly-opening channellike configuration of the cover and includes generally L-shaped shoulder parts 112 which project downwardly past the bottom flanges 109 so as to seat against the top flanges 103, thereby maintaining the cover 106 in slightly upwardly spaced relation from the top flanges 103 so as to define elongate access slots 114 which extend longitudinally of the upper rail 13 and open inwardly from opposite sides thereof in the vicinity of the upper edges thereof. The mounting clips 111 also have cantilevered resilient flanges 113 which project downwardly from the shoulder parts 112 so as to resiliently defect inwardly and then snap into engagement partially beneath the top flanges 103 to fixedly but releasably connect the cover 106 to the rail member 99.

The free end of the rail member 99 projects into one of the upper openings 32 associated with the post member and is fixedly secured to the post member by means of a U-shaped collar and L-shaped brackets, such as the collar 56 and brackets 53 as also used for securing the lower rail 12 to the post member. The securement of the upper rail to the post occurs in the same manner as described above relative to the lower rail, the only difference being that the collar 56 is inverted so as to open upwardly so that the collar straddles the bottom and side walls of the rail, but otherwise the upper rail is fixedly secured relative to the post in the same manner described above relative to the lower rail.

The upper rail 13 has at least one, and in the illustrated embodiment a plurality of openings 116 formed through one of the walls thereof, which openings 116 are formed through the bottom wall 111 at least in the vicinity of the opposite ends of the rail. These openings 116 are normally provided with a removable snap-in plastic cover plate when the openings 116 are not in use. Each opening 116 is adapted, however, to have a mounting plate 117 positioned therein and secured relative to the rail by snap-in tabs. The mounting plate 117 can be provided with one or more conventional communication connectors 118 thereon, such as a conventional phone jack or any other conventional communication or data-transmitting connector. The connectors 118 are adapted for connection with low-voltage telecommunication cables 119 which extend longitudinally through the hollow interiors of the upper rails.

Alternatively, the upper rail can have a housing 121 secured thereto and suspended downwardly from the bottom wall thereof, which housing opens upwardly through the opening 116 for accessing the interior of the upper rail. This housing 121 can have one or more conventional communication connectors 122 provided on one of the side walls 123 thereof, which connectors 122 again connect to telecommunication cables 119 which project through the rail and then downwardly through the opening 116 into the housing 121 for joining to the appropriate connectors. Multiple housings can be mounted under the rail, if desired, so as to provide the necessary number of connectors.

With either of the arrangements described above, appropriate telecommunication equipment can be disposed adjacent the system and the connector on the equipment suitably plugged into and joined to the appropriate connector mounted on the upper rail.

The arrangement 11 of this invention is also adapted to have a skin arrangement 131 (FIG. 3) mounted on and associated with one or more of the sections 14 if desired, with this skin arrangement 131 being positionable adjacent either or both sides of the section 14.

For example, and as illustrated by FIG. 2, the skin arrangement 131 illustrated therein includes at least two hooks 132 disposed in longitudinally spaced relation and engaged with the upper rail 13. Each hook 132 includes an L-shaped hook part 133 which projects through the access slot 114 so that the inner end of the hook part projects downwardly for engagement with the top flange 103. This L-shaped hook part 133 joins to a vertically downwardly projecting abutment wall 134 which substantially directly overlies and abuts the outer side surface of the upper rail. The hook 132 also has a support yoke or loop 135 which is spaced outwardly a small distance from the side surface of the rail. The support yokes or loops 135 associated with the spaced hooks removably mount thereon an elongate support rod 136. This rod in turn slidably passes through a loop 137 formed in the upper edge of an enlarged sheetlike cover 138 which functions as a skin. This cover can be suitably formed from an enlarged sheet of thin flexible material such as cloth, fabric, plastic or the like. The cover 138 at its lower end preferably has another loop formed along the lower edge thereof for accommodating a bottom rod 139, the latter providing sufficient weight so as to effect downward stretching of the skin 138 so as to maintain it in a relatively flat and vertically planar condition. The lower edge of the skin will normally be disposed in the vicinity of the lower edge of the lower rail, or possibly even lightly somewhat lower, depending upon the desired aesthetics.

The cover or skin 138 can be of colorful fabrics, either plain or with patterns or information printed thereon, so as to function as a barrier or as a decorative divider by effectively closing off the openness of the appropriate section 14, and thereby providing additional screening or privacy therebehind. The cover or skin 138 will normally have a horizontal length which is at least occupies a majority of the length of the section 14 as defined between adjacent posts. Alternatively, depending upon the outward extension of the hook, the skin can be wide enough so as to overlap the front faces of the posts defining the section, if desired.

Figure 12:
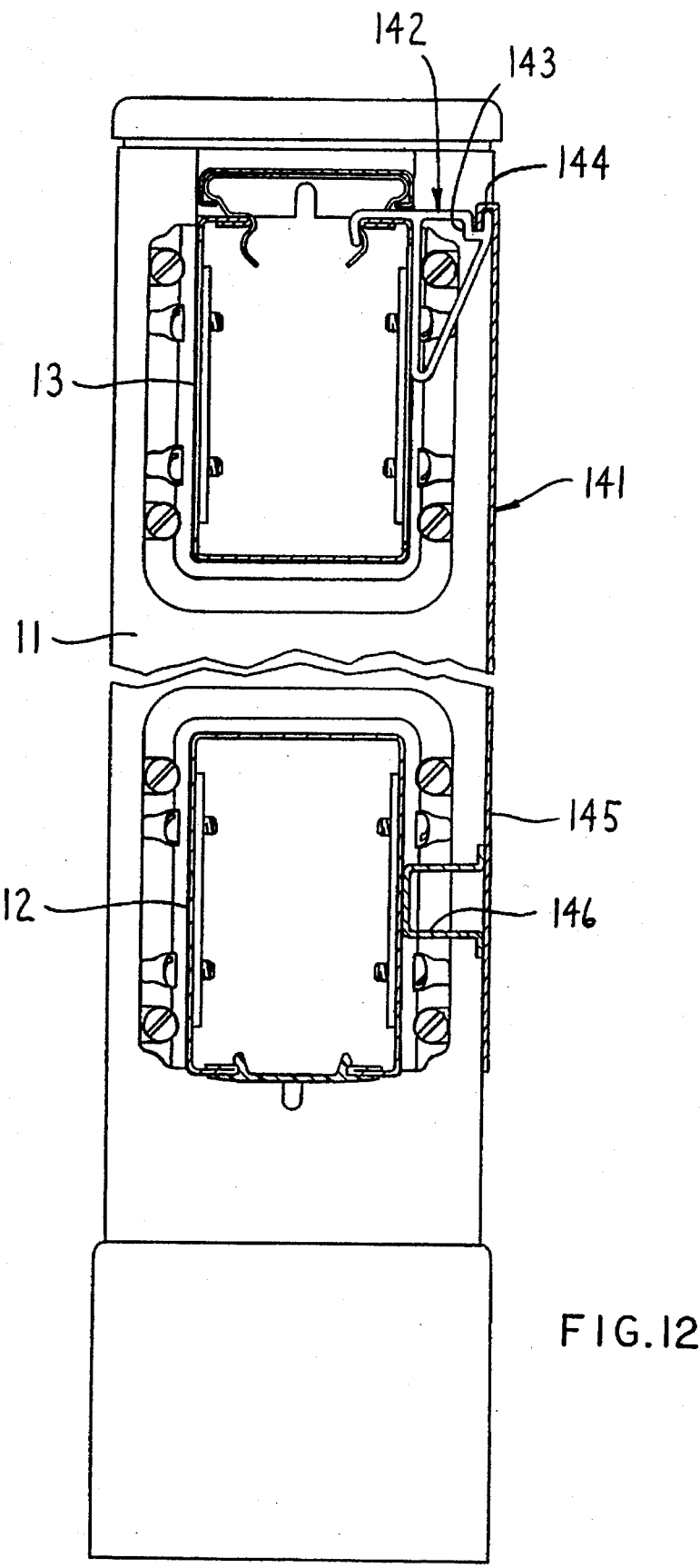
FIG. 12 is an enlarged, fragmentary sectional view taken generally along line 12—12 in FIG. 11.

Referring to FIG. 12, there is illustrated a modified skin arrangement 141 which again includes a hook 142 having an upper hook part 143 which projects through the access slot for engagement with the upper rail. This hook part 143 has an outer hook portion which engages an inverted upper channel part 144 formed at the upper end edge of a vertically enlarged skin or panel 145. This skin or panel 145 is a rigid, thin, sheetlike member having a length at least sufficient so as to substantially totally occupy the spacing between adjacent posts and, in the embodiment illustrated by FIG. 12, has a somewhat greater length so that the ends of the skin partially overlap the exposed side walls of the cooperating pair of posts. The panel 145 can be used for privacy and/or decorative purposes. The panel 145 is suspended downwardly from the hooks, and is preferably provided with stops or spacers 146 secured to the rear surface thereof, which spacers abut against the front face of the lower rail so as to maintain the skin in the desired vertically suspended position. The lower edge of the skin will normally be disposed in close proximity to the lower edge of the lower rail.

The use and operation of the space-dividing distribution system 10 of this invention will now be briefly described.

The post assemblies 11 and rails 12, 13 will be assembled in the desired orientation, with each post assembly 11 permitting rails to be secured thereto on from one up to all four sides thereof, if desired. That is, the rails can be disposed in aligned relationship to project from opposite sides of an individual posts, or in perpendicular relationship thereto, both conditions being depicted in FIG. 1, or a T or cross arrangement can be formed, if desired. The assembled arrangement 10 will normally employ at least some sections 14 extending in perpendicular relationship so that the upright arrangement 10 is thus freestanding. Other suitable supporting braces or feet can be provided, however, if necessary.

Figure 9:
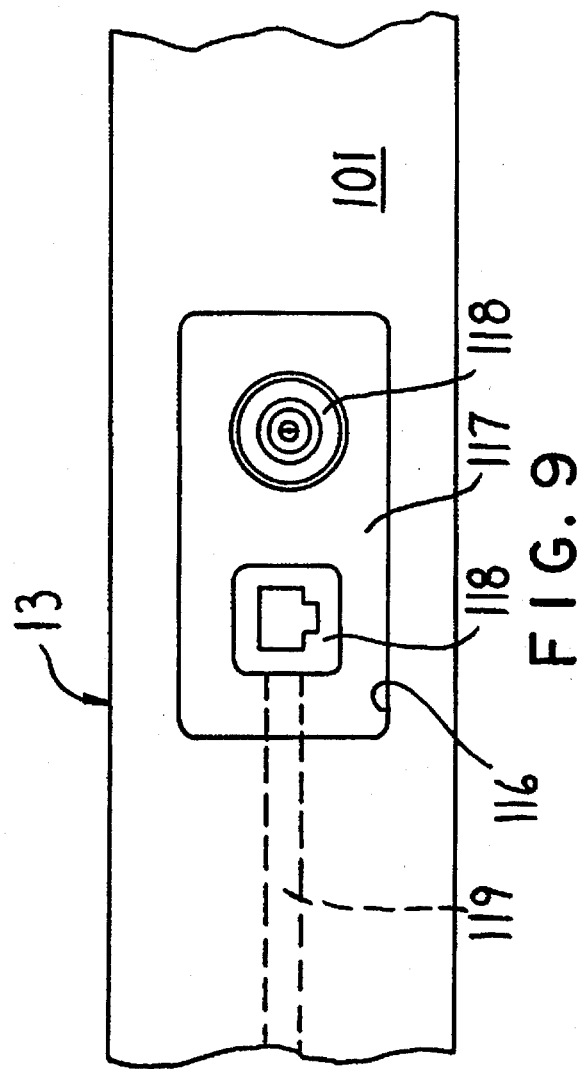
FIG. 9 is a fragmentary view taken generally along line 9—9 in FIG. 1.

After the arrangement has been assembled, appropriate communication cables 119 can be laid into the upper rail 13 as appropriate. For this purpose, the post top caps 36 and the rail top covers 106 are removed, thereby enabling the communication cables 119 to be easily laid into the rails 13 through the open upper edges as well as across or through the open upper ends of the posts. The communication cables can then be attached to appropriate communication connectors, either those disposed in boxes 121 or those which are provided on mounting plates 117 (FIG. 9) as mounted on the bottom wall of the rails. The other ends of the communication cables are appropriately fed out of the rail and thence downwardly to the floor or upwardly to the ceiling, for feeding back to the communication closet. The post top caps 36 and rail top covers 106 are then reinstalled so as to effect enclosure of the communication cables.

Figure 10:
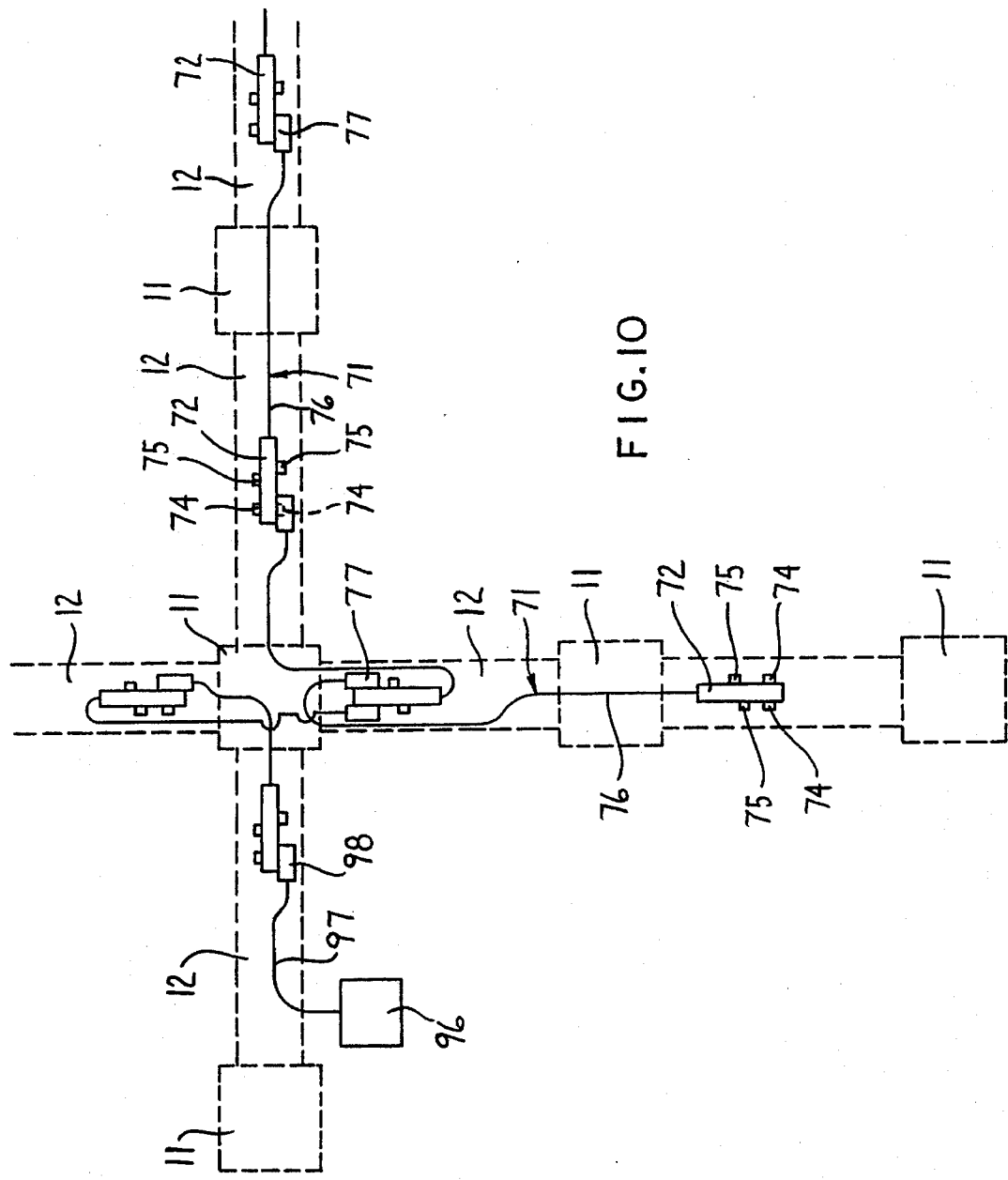
FIG. 10 is a diagrammatic plan view which illustrates the manner in which several power modules extend between and interconnect along the rails of adjacent sections of the arrangement.
Figure 11:
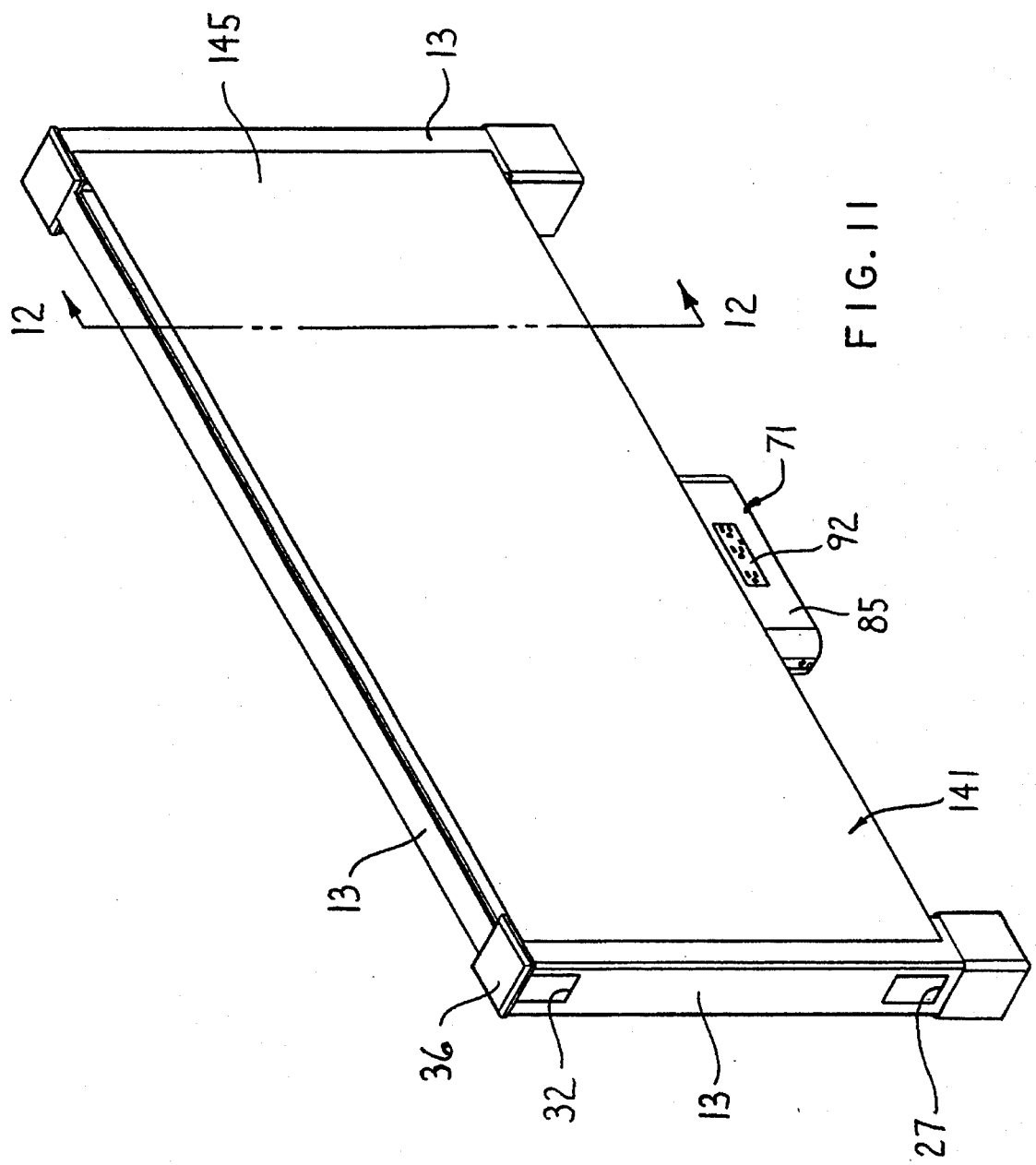
FIG. 11 is a perspective view illustrating a section of the arrangement having a rigid skin attached to one side thereof.

As to the power rails 12, the bottom covers 61 are removed to facilitate mounting of the power modules 71 and the feeding of the cables 76 along the rails. Positions are determined where a power block is to be provided, and then the housing 81 is secured to the bottom of the rail 12 so that the power block 72 is suspended downwardly therefrom as the selected location. The associated cable 76 is then fed up into the rail and can be extended in either direction along the rail. Upon reaching a post, the free end of the cable 76 bearing the connector block 77 thereon is fed through the post openings 27 across the post into an adjoining rail, and thence along that rail to the location of a further power block 72, whereupon the cable and the connector 77 is bent downwardly as illustrated in FIG. 6 and plugged into one of the side connectors 74. In this fashion, a plurality of power modules 71 can be interconnected along several sections 14 of the distribution system, as diagrammatically illustrated in FIG. 10. The electrical power is then supplied to the interconnected power modules from a suitable power source, such as a floor monument 96 through a power supply cable 97 which has a connector block 98 on the end thereof, the latter being substantially identical to the connector block 77 and being adapted to create a mechanical and electrical pluglike connection to one of the exposed connectors 74 associated with one of the power blocks 72.

A receptacle unit 92 can be releasably plugged onto one or both sides of each power block 72 if exterior receptacles or sockets 93 are desired at that location. Thereafter the module covers 84 and 85 are positioned on opposite sides of each power block and moved into engagement with the edges of the mounting plate 81, with the bottom and side flanges being engaged and then screwed together to fix the cover to the underside of the rail 12 in enclosing relationship to the power block 72. Prior to mounting of the module covers, however, the bottom covers 61 are re-engaged into the bottom opening 48 of the rail 12 so as to close the rail and thereby enclose the cables 76 therein. These covers come in various lengths, and can even be easily cut to the length if desired, so as to totally fill the full length of the opening 48 which extends outwardly from opposite sides of the power block.

The power modules 71 may be provided with different lengths of connector cables 76 associated therewith, preferably several different lengths being provided so as to facilitate the supplying and providing or positioning of power block 72 at desired and expected locations.

Figure 14:
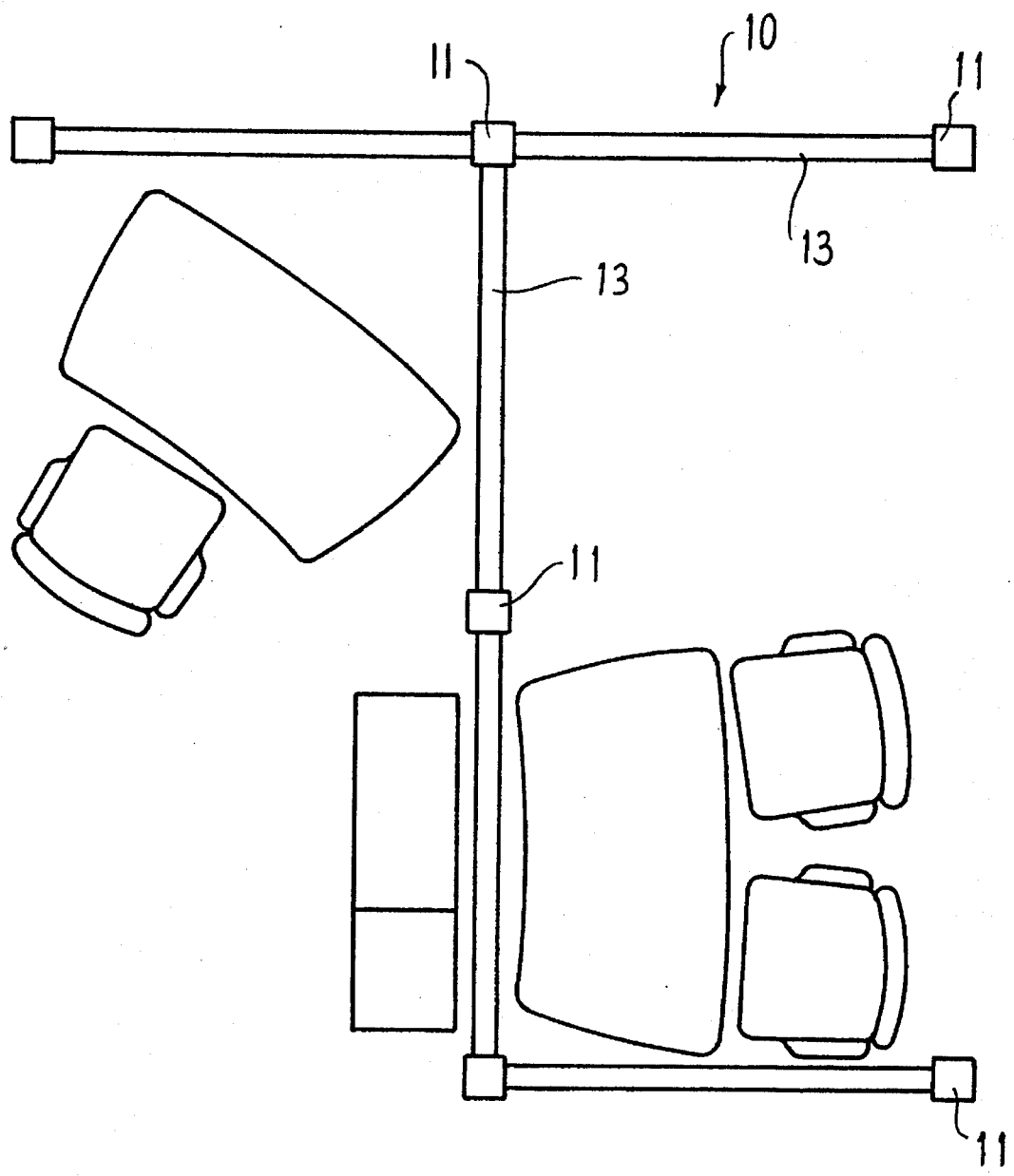
FIG. 14 is a diagrammatic plan view of the system used for defining workstations.

With the arrangement assembled as described above, and as illustrated by FIG. 1, various furniture components such as worksurface components (tables, desks and the like) can be positioned in close proximity to the upright arrangement 10 as indicated in FIG. 14, with electrical equipment as mounted on the worksurfaces then being easily plugged into the receptacle units mounted on the lower rail 12. Similarly, computers or telephones or the like can be easily plugged into the communication connectors mounted on the upper rail.

Figure 13:
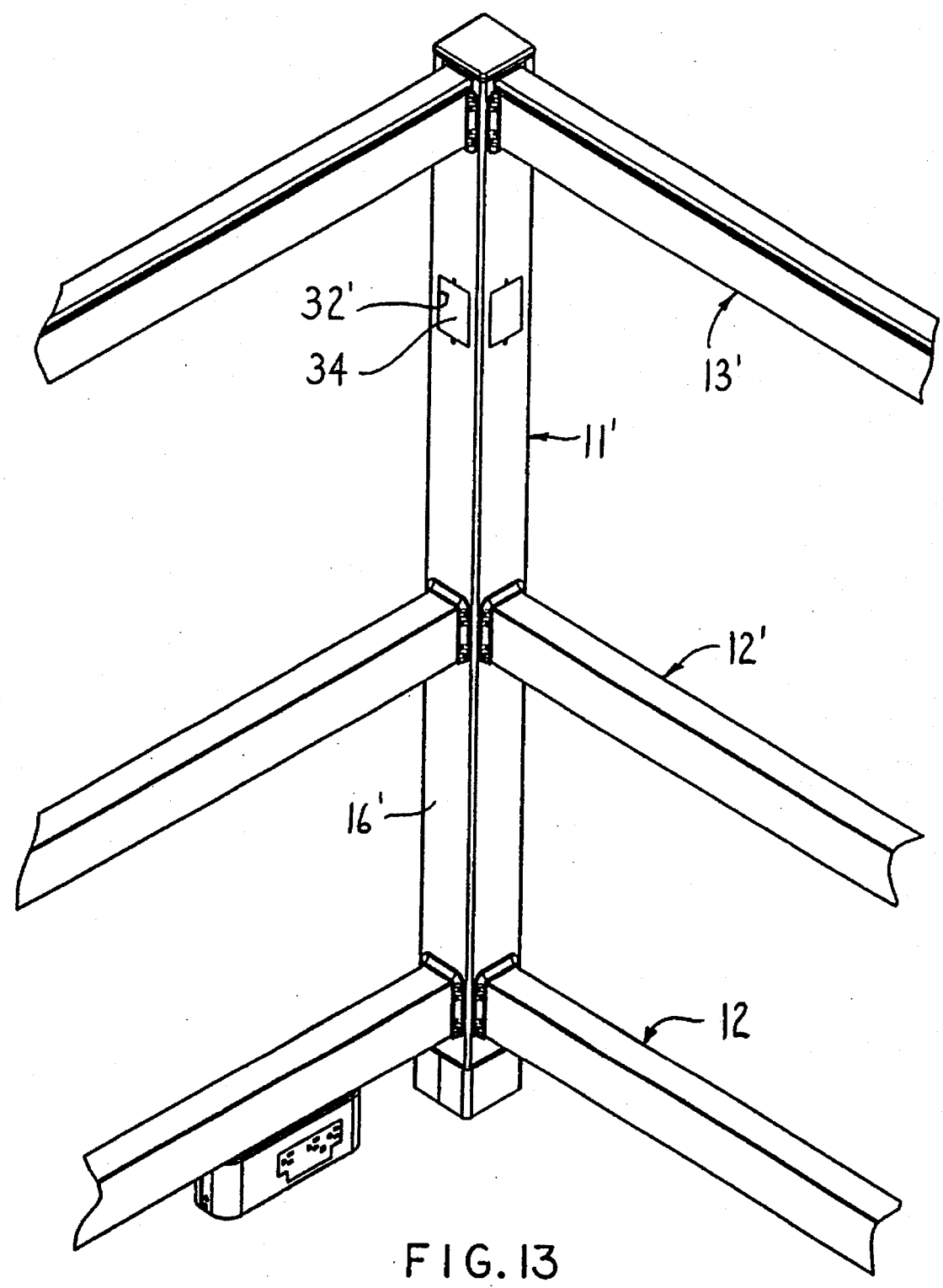
FIG. 13 is a fragmentary perspective view illustrating a variation of the present invention.

While the arrangement illustrated by FIG. 1 and describe above accommodates only two rails, it will be appreciated that posts of greater height can be provided and will accommodate more rails if desired. Referencing FIG. 13, there is illustrated a modified post assembly 11 which is of greater height and which again accommodates a lower power rail 12 and an upper communication rail 13 adjacent opposite ends thereof, although in this illustration the post also contains two additional sets of openings disposed intermediate the vertical height thereof, with one intermediate set being illustrated as having an additional rail 12' associated therewith. The post has a further set of intermediate openings designated 32' which are closed by the covers 34'. This latter set of openings 32' can also be provided with a rail, either a power rail 12 or a communication rail 13. The rail 12' could also be replaced with a communication rail 13, if desired.

After the distribution arrangement 10 has been assembled and electrical power and communication access is provided at the desired locations, then skin arrangements 131 or 141 can then be provided on selected sections 14 of the arrangement 10 when and as desired.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An upright space-dividing arrangement for distributing electrical power and telecommunication cables so as to permit access thereto from adjacent workstations, comprising:

a plurality of horizontally-spaced upright hollow posts each supported on and projecting upwardly from a floor and terminating at an upper free end, each said post having upper and lower openings disposed in vertically spaced relation and extending horizontally therethrough;

a plurality of horizontally elongate lower rails each extending horizontally between and being releasably fixedly joined to a pair of said posts, each said lower rail having an elongate lengthwise extending channel which at opposite ends thereof is in communication with the lower openings of the joined posts, at least two of said lower rails being rigidly releasably joined to an intermediate said post so that the elongate channels thereof communicate with one another through the lower openings defined in the intermediate post;

a plurality of horizontally elongate upper rails each extending horizontally between and being fixedly joined to a pair of said posts and vertically spaced from corresponding said plurality of lower rails, each said upper rail having an elongate lengthwise-extending channel which at opposite ends thereof is in communication with the upper openings of the joined posts, at least two of said upper rails being rigidly releasably joined to said intermediate post so that the elongate channels thereof are in open communication with one another through the upper openings of said intermediate post;

a said lower rail, a corresponding said upper rail, and said pair of said posts define a transversely accessible open region therebetween;

electrical power means extending along selected ones of said elongate lower rails and through lower openings of selected said posts, said electrical power means including elongate flexible electrical power transmitting cabling extending through the lower openings of said intermediate post and into the channels of said pair of lower rails attached to said intermediate post, said electrical power means including a power block connected to said cabling and mounted on one of the lower rails of said pair and defining thereon an electrical receptacle which faces sidewardly of the lower rail and accommodates a conventional electrical plug; and telecommunication cabling extending through the upper openings of said intermediate post and into and along the channels of the pair of upper rails joined to said intermediate post and connected to a telecommunication connector which is stationarily mounted on one of the upper rails of said pair.

2. A system according to claim 1, wherein said lower rail includes a horizontally elongate rail member having a generally inverted channel-shaped cross section defined by top and generally parallel side walls and defining an access opening extending longitudinally of the respective rail member along a bottom thereof, said power block being stationarily mounted on and suspended downwardly below said rail member, and a bottom cover removably mounted on said rail member and extending longitudinally therealong for closing off said access opening.

3. A system according to claim 2, wherein said electrical power means includes a plurality of interconnected power modules, each module including a said power block having an elongate electrical cable joined thereto and extending therefrom and at a free end thereof terminating in a plug-in electrical connector, each power block having an electrical connector associated therewith for engagement with the plug-in connector of a second said power module, and a separate receptacle unit defining thereon said receptacle and having an electrical pluglike engagement with the power block.

4. A system according to claim 3, wherein the power block permits a said receptacle unit to be engaged therewith on either or both sides thereof so as to permit access to said receptacles from either side of the lower rail, and a cover arrangement fixed to and suspended downwardly from the lower rail for generally enclosing the power block and the receptacle unit mounted thereon, the cover having an opening formed in a side wall thereof for accessing the receptacle.

5. A system according to claim 1, wherein the upper rail includes a generally upwardly-opening channel-shaped upper rail member defining a top access opening extending longitudinally throughout the entire length thereof for facilitating access to the channel within the upper rail member for laying in of telecommunication cabling, and a top cover removably mounted on said upper rail member for closing off the channel thereof.

6. A system according to claim 5, wherein the upper openings in the post are formed adjacent the upper free end thereof and extends upwardly so as to open through an upper free end edge of said post, and a removable top cap mounted on the upper free end of said post for closing off upper edges of said upper openings, whereby removal of said top cover and top cap enables telecommunication cabling to be laid into the channels of the upper rails including laid into the upper openings so as to extend horizontally through the interior of the post.

7. An upright space-dividing arrangement for distributing electrical power and telecommunication cables so as to permit access thereto from adjacent workstations, comprising:

a plurality of horizontally-spaced upright hollow posts each supported on and protecting upwardly from a floor and terminating at an upper free end, each said post having upper and lower openings disposed in vertically spaced relation and extending horizontally therethrough;

a plurality of horizontally elongate lower rails each extending horizontally between and being fixedly joined to a pair of said posts, each said lower rail having an elongate lengthwise extending channel which at opposite ends thereof is in communication with the lower openings of the joined posts, at least two of said lower rails being rigidly joined to an intermediate said post so that the elongate channels thereof communicate with one another through the lower openings defined in the intermediate post;

a plurality of horizontally elongate upper rails each extending horizontally between and being fixedly joined to a pair of said posts, each said upper rail having an elongate lengthwise-extending channel which at opposite ends thereof is in communication with the upper openings of the joined posts, at least two of said upper rails being joined to said intermediate post so that the elongate channels thereof are in open communication with one another through the upper openings of said intermediate post;

electrical power means extending along selected ones of said elongate lower rail and through lower openings of selected said posts, said electrical power means including elongate flexible electrical power transmitting cabling extending through the lower openings of said intermediate post and into the channels of said pair of lower rails attached to said intermediate post, said electrical power means including a power block connected to said cabling and mounted on one of the lower rails of said pair and defining thereon an electrical receptacle which faces sidewardly of the lower rail and accommodates a conventional electrical plug;

telecommunication cabling extending through the upper openings of said intermediate post and into and along the channels of the pair of upper rails joined to said intermediate post and connected to a telecommunication connector which is stationarily mounted on one of the upper rails of said pair;

the upper rail includes a generally upwardly-opening channel-shaped upper rail member defining a top access opening extending longitudinally throughout the entire length thereof for facilitating access to the channel within the upper rail member for laying in of telecommunication cabling, and a top cover removably mounted on said upper rail member for closing off the channel thereof;

the upper rail member and the top cover cooperate to define horizontally elongate narrow access slots therebetween which extend lengthwise of the upper rail on opposite sides thereof;

a face skin arrangement mounted on said upper rail and projecting downwardly along at least one side of the upper and lower rails fixedly joined between a pair of adjacent posts, said face skin arrangement including a vertically and horizontally enlarged thin face skin which is disposed generally within a vertical plane and is positioned adjacent one side of said upper and lower rails and extends vertically therebetween; and a hook means joined to said face skin adjacent an upper edge thereof and projecting through one of said access slots for support on said upper rail.

8. A system according to claim 5, wherein the bottom wall of the upper rail member has opening means formed therethrough for mounting a said telecommunication connector at or below said bottom wall.

9. A system according to claim 1, wherein said post is of generally square cross section defined by four vertically flat side walls which are each perpendicularly joined between a pair of adjacent said side walls, each of said side walls having a said upper opening and a said lower opening formed therethrough with all of said upper openings being disposed generally at the same elevation closely adjacent the upper free end of the post, and all of said lower openings being disposed at the same elevation and disposed downwardly a significant distance below said upper openings but upwardly a significant distance from a lower free end of said post, and removable cover plates mounted within and closing off all of said upper and lower openings which are not accessed by upper and lower rails.

10. A system according to claim 9, including a support plate fixedly mounted on said post adjacent a lower end thereof, a threaded support glide engaged with said support plate and being vertically adjustable, said support glide having a foot plate at a lower end thereof for supportive engagement with the floor, and an axially short collar slidably and closely exteriorly surrounding said post and being slidable downwardly therealong for engagement with the floor for enclosing the glide.

11. A system according to claim 1, wherein said post has a generally square cross section, each said upper and lower opening being of a generally vertically elongated rectangular configuration having a width which is significantly less than the width of the side wall of the post, and each of said upper and lower rail having a width which generally corresponds to the width of the respective upper and lower opening and a length so that the rail adjacent a free end thereof projects slightly into the respective opening through the side wall of the post for direct supportive engagement on the side wall, and removable fastener means cooperating between the respective rail member and the side wall of the post for fixedly joining the rail to the post.

12. A system according to claim 1, wherein the upper rail has an access opening formed in a top wall thereof and extending longitudinally throughout the length thereof for permitting telecommunication cables to be laid into the upper rail, the upper openings as formed in the post opening upwardly through an upper free edge thereof, a removable top cap mounted on the post for closing off upper edges of the upper openings, a removable top cover stationarily mounted on the upper rail for closing off the upper access opening, said lower rail having an access opening formed in and extending lengthwise thereof throughout a bottom wall thereof to permit electrical cabling to be inserted into the lower rail through the bottom access opening, and an elongate cover member removably mounted on the bottom of the lower rail for closing off said bottom access opening.

13. A system according to claim 12, wherein said upper rail is disposed adjacent but is slightly vertically spaced downwardly from the upper free ends of the posts, wherein the lower rail is spaced vertically downwardly a substantial distance from the upper rails so as to define a significant open space extending vertically therebetween, and the lower rails being spaced vertically upwardly a substantial distance above the floor so as to define a significant open vertical space therebetween.

14. A system according to claim 1, wherein a third said upper rail and a third said lower rail are joined to and project away from said intermediate post.

15. An upright space-dividing fence arrangement for distributing electrical power and telecommunication cables to permit access thereto from adjacent workstations, comprising:

a plurality of horizontally-spaced upright hollow posts each supported and projecting upwardly from a floor and terminating at an upper free end, said plurality of posts including at least first, second and third said posts which are all disposed in substantial horizontally spaced relation from one another;

each said post having a plurality of upper openings formed in side walls thereof for communication with a hollow interior of the post, each said post also including a plurality of lower openings formed in the side walls thereof for communication with the hollow interior thereof, said plurality of upper openings being disposed so that centers thereof are defined generally within a first horizontal plane, and centers of the plurality of lower openings are defined within a second generally horizontal plane which is spaced vertically downwardly a substantial distance below said first horizontal plane and above the floor;

a plurality of horizontally elongate lower rails each extending horizontally between and being joined to a pair of said posts, each said lower rail having an elongate lengthwise extending channel which at opposite ends thereof is in communication with the lower openings of the joined posts, at least a first said lower rail being releasably joined to and extending between said first and second posts, and a second said lower rail being releasably joined to and extending horizontally between said second and third posts so that the elongate channels in said first and second lower rails communicate with one another through the lower openings defined in said second post;

a plurality of horizontally elongate upper rails each extending horizontally between and being joined to a pair of said upright posts, each said upper rail having an elongate lengthwise extending channel which at opposite ends thereof is in communication with the upper openings of the joined post, a first said upper rail extending horizontally between and being joined to said first and second posts, and a second said upper rail extending horizontally between and being joined to said second and third posts so that the elongate channels thereof communicate with one another through the upper openings defined in said second post;

said upper rails being spaced vertically upwardly from corresponding said lower rails so that there is defined therebetween a vertically extending open and transversely-accessible space which extends horizontally between the joined posts;

electrical power means extending along selected ones of said elongate lower rails and through lower openings of selected said posts, said electrical power means including elongate flexible electrical power transmitting cabling extending through the lower openings of said second post and into the channels of said first and second lower rails, said electrical power means including a power block connected to said cabling and mounted on one of said first and second lower rails and defining thereon an electrical receptacle which accommodates a conventional electrical plug; and telecommunication cabling extending through the upper openings of said second post and into and along the channels of said first and second upper rails and connected to a telecommunication connector which is stationarily mounted on one of said first and second upper rails.

16. The fence arrangement according to claim 15, wherein adjacent said posts are joined together solely by said horizontally extending upper and lower rails, thereby defining vertical boundaries of said open and transversely-accessible space.

17. The fence arrangement according to claim 16, wherein said posts and rails define a self-supporting upright structure which is free of structural supportive connection to other furniture components associated with an adjacent workstation.

18. The fence arrangement according to claim 15, wherein said posts are designed to solely support said lower and upper rails, and hence support said electrical power means and said telecommunication cabling in respective said lower and upper rails.

19. The fence arrangement according to claim 15, wherein said upper rails are upwardly open elongate U-shaped channels, and further comprises a removable cover member closing an upwardly open side of said U-shaped channel to enclose the telecommunication cabling in said U-shaped channel.

20. The fence arrangement according to claim 19, wherein an elongate slot is provided between said U-shaped channel and said cover member to allow access to said telecommunication cabling generally anywhere along said upper rail.

21. The fence arrangement according to claim 15, wherein said lower rail is an inverted U-shaped channel having an opening facing downwardly toward the floor for receiving said electrical power means therein, and further comprises a removable cover for closing said opening in said inverted U-shaped channel.

22. The fence arrangement according to claim 15, wherein said power block is mounted below said lower rail with said electrical receptacle facing sidewardly from below said lower rail.

23. The fence arrangement according to claim 15, further comprising releasable joining means for releasably connecting opposite ends of both said upper rails and said lower rails to respective said upper openings and said lower openings in said upright hollow posts.

24. The fencing arrangement according to claim 15, wherein said plurality of upright hollow posts are square hollow tubular posts having four upper openings positioned one on each side of said square posts, and four lower openings positioned one on each side of said square posts and disposed vertically downwardly from said four upper openings.

25. The fence arrangement according to claim 15, further comprising a plurality of mid-level openings in said posts located vertically downwardly spaced from said upper openings and vertically upwardly spaced from said lower openings, said plurality of mid-level openings being disposed in said posts so that centers thereof are generally defined in a third horizontal plane spaced vertically downwardly from said first horizontal plane and vertically upwardly from said second horizontal plane, and a plurality of mid-level rails each extending horizontally between and being joined to said pair of said posts at said mid-level openings, thereby dividing said vertically extending open and transversely accessible space into two vertically extending open and transversely accessible spaces.

\* \* \* \* \*